UNITED STATES PATENT OFFICE.

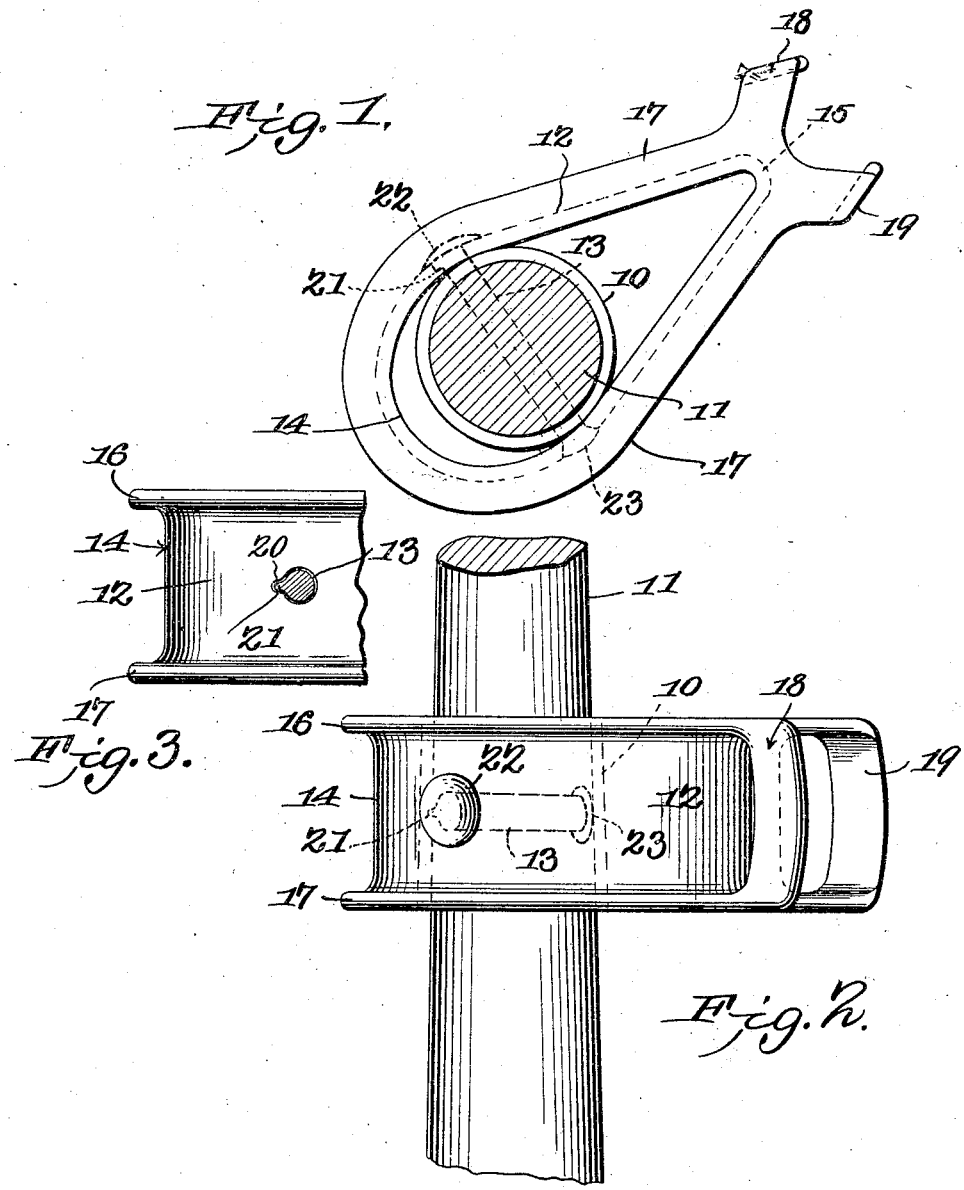

DAVID D. NELSON, OF MINDENMINES, MISSOURI.

NECK-YOKE ATTACHMENT.

No. 842,809.
Specification of Letters Patent.
Patented Jan. 29, 1907.

Application filed January 30, 1906. Serial No. 298,708.

*To all whom it may concern:*

Be it known that I, DAVID D. NELSON, a citizen of the United States, residing at Mindenmines, in the county of Barton and State of Missouri, have invented a new and useful Neck-Yoke Attachment, of which the following is a specification.

This invention relates to neck-yoke attachments, and has for its object to improve the construction and increase the efficiency and utility of devices of this character.

With these and other objects in view, which will appear as the nature of the invention is better understood, the invention consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation.

In the drawings, Figure 1 is a side elevation, and Fig. 2 is a plan view, of the improved device applied to a section of a neck-yoke. Fig. 3 is a detail, partly in section, illustrating the manner of arranging the securing-pin.

One of the improved devices will be attached to the neck-yoke near each end and consists of a ferrule 10 encircling and closely engaging the neck-yoke, a portion of which is represented at 11, an oblong frame 12 bearing around the ferrule and a pivot-pin 13 uniting the ferrule and frame and permitting the latter to swing laterally upon the ferrule to a limited extent. The frame 12 is curved to correspond substantially with the ferrule at one end, as at 14, and with the sides converging and united at the other end, as at 15, the frame having spaced confining ribs 16 17 around the edges and strap-loops 18 19 at the smaller end.

The neck-yoke straps are designed to pass around the frame 12 and between the ribs 16 17 and beneath the loops 18 19; but as the construction and operation of these straps are so well known it is not deemed necessary to illustrate them.

One of the apertures for the pin 13 in the frame 12 is formed with a lateral recess 20, and the pin 13 is provided with a small lug 21 next its head to engage this recess, and thus couple the pin to the frame and cause it to partake of the swinging motion of the frame. The pin 13 is preferably riveted at the end 23 opposite the head 22. The friction is thus between the less expensive ferrule and rivet, and the more expensive frame 12 is relieved largely from wearing strains. The renewal of worn parts can thus be made at a comparatively small expense by merely replacing the ferrule or rivet.

By this arrangement a very simple, strong, and durable device is produced which effectually prevents wear or friction between the straps and neck-yoke and in which the friction and wear between the parts is reduced to a minimum.

Having thus described the invention, what is claimed is—

1. A neck-yoke attachment comprising a ferrule for encircling and closely engaging the neck-yoke, an oblong frame bearing over the opposite sides of said ferrule and curved at one end and spaced from the ferrule and with the sides converging toward and united at the other end and a pin passing through said frame and ferrule and also through the neck-yoke and secured from turning in said frame.

2. A neck-yoke attachment comprising a ferrule for encircling and closely engaging the neck-yoke, an oblong frame bearing over the opposite sides of said ferrule and curved at one end and spaced from the ferrule and with the sides converging toward and united at the other end, said frame ferrule and neck-yoke having transverse registering apertures with a lateral recess in one of the frame-apertures, and a pin extending through said apertures and provided with a stud extending into said recess.

In testimony that I claim the foregoing as my own I have hereto affixed my signature in the presence of two witnesses.

DAVID D. NELSON.

Witnesses:
F. H. NELSON,
W. H. SMITHER.